Aug. 14, 1951     A. HOROWITZ ET AL     2,564,109
LUBRICATION OF THE CYLINDERS OF PISTON ENGINES
Filed July 22, 1946
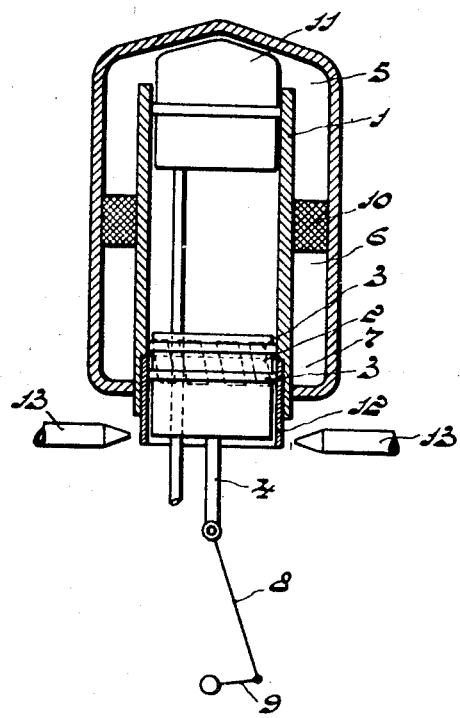
INVENTORS
ALEXANDRE HOROWITZ
GERHARD RATHENAU
BY
AGENT Patented Aug. 14, 1951

2,564,109

UNITED STATES PATENT OFFICE 2,564,109

LUBRICATION OF THE CYLINDERS OF PISTON ENGINES

Alexandre Horowitz and Gerhard Rathenau, Eindhoven, Netherlands, assignors to Hartford National Bank and Trust Company, Hartford, Conn., as trustee Application July 22, 1946, Serial No. 685,564
In the Netherlands December 15, 1945

2 Claims. (Cl. 309—3)

In a piston engine, which is an engine wherein as one of the principal parts a piston performs a reciprocating movement in a cylinder, the lubrication of the wall of the cylinder is in most cases a difficult problem. Several methods of lubricating the wall of the cylinder of a piston engine are known. The lubricant may be mixed with the fuel, as is sometimes done in combustion motors. Besides, the open end of the piston, when leaving the cylinder at the end of the stroke, is sometimes moistened with the lubricant either by splashing or by a sprinkler. Furthermore, lubrication under pressure by means of oil pumps and the like are known. With all these methods care must be taken to ensure that the lubrication is not too abundant. With steam engines an abundant lubrication results in contamination of the condensate or of the exhaust steam, whereas in combustion motors the excess of oil either may carbonize, or cause contamination. With compressors and similar engines the excess of oil is taken along by the compressed gas and may lead to all kinds of inconveniences. Particularly with hot-gas piston engines, such as hot-gas motors or refrigerating engines operating according to the reverse hot-gas engine principle, another serious drawback may occur. By hot-gas engines is meant that class of external combustion engines in which heat is cyclically added to a given quantity of gaseous medium which results in the production of mechanical energy in accordance with the thermodynamic cycle involved. The engine basically comprises a hot space, a heater, a regenerator, a cooler and a cold space, all arranged in open communication with each other and in the order named. When the engine is operated according to the reverse hot-gas engine principle, mechanical energy is cyclically supplied to the thermodynamic cycle and a refrigerating effect is produced. A more complete discussion of the hot-gas engine and the reverse principle of operation, can be found in the publication "Philips Technical Review," May 1946, vol. 8, No. 5, pages 129 to 136 inclusive. In order to obtain a high thermal efficiency in such engines, the regenerator is located in the channel by which the hot space communicates with the cold space and through which the medium flows to and fro. Such a regenerator is capable of absorbing heat from the hot medium when the latter passes and retaining this absorbed heat and giving off this heat when the cold medium passes.

One of the conditions which a regenerator has to satisfy is that it must offer as little resistance as possible to the flowing medium. If, now, the lubrication of the cylinder wall is too abundant, oil or other lubricant particles and disintegration products thereof may be taken along by the flowing medium and find their way into the regenerator, which has fine pores. They might stick there and carbonize due to the high temperature and thus choke the pores or at least have the effect that the flowing medium begins to meet with too high a resistance in the regenerator.

Now, the present invention purports to meet the drawback of excessive lubrication of the cylinder.

According to the invention, the running surface of one or more cylinders of a piston engine and more particularly of a hot-gas motor or a refrigerating engine operating according to the reverse hot-gas motor principle locally consists of self-lubricating metal made of a porous material, preferably metallic, which serves to retain the lubricating fluid and serve as a reservoir for such lubricating fluid.

In order that the invention may be clearly understood and readily carried into effect, it will be described more fully by reference to the accompanying drawing, given by way of example.

The drawing shows a cylinder 1 of a hot-gas motor in which a piston 2 together with piston springs 3 can move. A piston rod 4 is coupled to the piston. A hot chamber 5 freely communicates with a cold chamber 7 through a channel 6. The piston rod 4 is coupled to the driving rod 8 and crank 9 which are shown diagrammatically. Inside the channel 6 is a regenerator 10 having a large number of small pores. In the cylinder moves also a displacer 11, coupled to the crank 9 in a manner which is not shown in the drawing.

If, now, the wall of the cylinder is lubricated excessively, there is a risk of oil drops being taken along by the medium which is contained in the hot chamber 5 and which, upon the upward stroke of the displacer 11, is pushed through the regenerator 10 to the cold chamber 7. These drops may stick in the regenerator 10 and might carbonize there as a result of the high temperature of the regenerator. With a scarce lubrication there will be no oil drops on the cylinder wall but in this case there is a risk of the lubrication not being adequate. Now, according to the invention, a lining or ring member 12 of self-lubricating metal is provided in the wall of the cylinder. Such self-lubricating on porous metals, per se, are already known in the art as, for example, in U. S. Patent No. 1,634,768 to C. E. Bonner for "Engine Lubrication," and in U. S.

Patent No. 1,835,971 to E. Shattanek for "Internal Combustion Engine" and may be, for example, a compressed and sintered carbonyl metal powder. The bottom of this ring projects a little from the cylinder wall and may be moistened by the splashing oil from the crank case. As an alternative, the ring may be moistened by one or more sprinklers 13 spraying a thin stream of oil against the ring. Owing to the porosity of the metal the oil is absorbed, the lubricant being regularly distributed over the cylinder wall by the piston.

According to the invention, instead of the ring 12, it is also possible to provide one or more strips of self-lubricating metal in the axial direction in the wall of the cylinder, which strips may at their bottom likewise project a little from the cylinder wall proper and may be fastened in the same manner.

It is evident that the two embodiments of the invention given above by way of examples may also be combined.

What we claim is:

1. Cylinder and piston apparatus comprising means defining a high pressure chamber and including a cylinder member, a reciprocable piston slidably arranged within said cylinder member and having only one face thereof exposed to the pressure in said chamber, said cylinder member having an inner wall comprising in part a porous lubricant reservoir portion of a predetermined over-all extent, said porous portion extending in part outside of said cylinder member, said porous portion being so positioned, said predetermined over-all extent being such, and the stroke of said piston being so related to said extent that said piston makes sliding contact with the surface of said porous portion during part of said piston movement but said porous portion is never exposed to said pressure in said chamber, and means to supply lubricating fluid to the exteriorly arranged extension of said porous portion.

2. Cylinder and piston apparatus comprising means defining a high pressure chamber and including a cylinder member proper of a predetermined diameter, a reciprocable piston slidably arranged within said cylinder member proper and having only one face thereof exposed to the pressure in said chamber, sealing means mounted on the periphery of said piston and engaging the interior surface of said cylinder member for sealing said pressure chamber, said cylinder member having a reservoir in the form of a porous cylindrical lining member of a diameter substantially equal to said predetermined diameter and arranged partly within said cylinder member proper and partly exterior thereto, and means limiting the stroke of said piston so that said sealing means on said piston makes sliding contact with the surface of said porous lining member during part of said piston movement and part of said sealing means always engages said walls of said cylinder member proper, and means to supply lubricating fluid to the exteriorly arranged portion of said porous lining member.

ALEXANDRE HOROWITZ.
GERHARD RATHENAU.

REFERENCES CITED

The following references are of record in the file of this patent:

UNITED STATES PATENTS

| Number | Name | Date |
|---|---|---|
| 334,037 | Nash | Jan. 12, 1886 |
| 650,576 | Wickstrom | May 29, 1900 |
| 974,854 | Boggs | Nov. 8, 1910 |
| 1,329,348 | Copeland | Jan. 27, 1920 |
| 1,634,768 | Bonner | July 5, 1927 |
| 1,835,971 | Schattanek | Dec. 8, 1931 |
| 1,964,671 | Nesbitt | June 26, 1934 |
| 1,955,292 | Heintz | Apr. 17, 1934 |
| 2,314,604 | Van der Horst | Mar. 23, 1943 |
| 2,465,139 | Van Weenen et al. | Mar. 22, 1949 |